(12) United States Patent
Friedrich et al.

(10) Patent No.: US 8,910,761 B2
(45) Date of Patent: Dec. 16, 2014

(54) DEVICE AND METHOD FOR THE ADAPTIVE DEGRADATION OF COLLISION ENERGY

(75) Inventors: Thomas Friedrich, Freiberg A.N. (DE); Willi Nagel, Remseck/Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 13/384,738

(22) PCT Filed: Jul. 27, 2010

(86) PCT No.: PCT/EP2010/060844
§ 371 (c)(1),
(2), (4) Date: Apr. 6, 2012

(87) PCT Pub. No.: WO2011/035952
PCT Pub. Date: Mar. 31, 2011

(65) Prior Publication Data
US 2012/0187616 A1    Jul. 26, 2012

(30) Foreign Application Priority Data

Sep. 24, 2009 (DE) .......................... 10 2009 044 966

(51) Int. Cl.
*F16F 7/12* (2006.01)
*B60R 19/34* (2006.01)
*B60R 19/00* (2006.01)

(52) U.S. Cl.
CPC ........... *B60R 19/34* (2013.01); *B60R 2019/007* (2013.01); *F16F 7/125* (2013.01)
USPC .......................................... 188/374; 188/372

(58) Field of Classification Search
CPC ............. F16F 7/12; F16F 7/123; F16F 7/125; F16F 7/126; F16F 7/127; F16F 7/128

USPC .......... 188/371, 374, 376, 377; 293/132, 133; 280/777, 784
See application file for complete search history.

(56) References Cited

U.S. PATENT DOCUMENTS 3,482,653 A * 12/1969 Yoshihiro et al. ............. 188/374
3,913,707 A * 10/1975 Wastenson et al. ........... 188/374
(Continued)

FOREIGN PATENT DOCUMENTS

DE         19745656      4/1999
EP          1792786      6/2007
(Continued)

OTHER PUBLICATIONS

International Search Report, PCT International Application No. PCT/EP2010/060844, dated Nov. 4, 2010.

*Primary Examiner* — Bradley King
*Assistant Examiner* — Nicholas J Lane
(74) *Attorney, Agent, or Firm* — Kenyon & Kenyon LLP

(57) ABSTRACT

A device and a method for the adaptive degradation of collision energy. A deformation element is provided which carries out a first motion in one direction for degrading the collision energy and undergoes tapering. In addition, an actuator system is provided which adjusts the tapering for the adaptive degradation as a function of a control signal. The actuator system is configured for a second motion in the axis of the direction of the first motion and for adjusting the tapering of the deformation element. As a result of the second motion, the actuator system is able to hold at least one die plate having a respective opening through which the deformation element is driven for adjusting the tapering. A number of die plates held by the actuator system is a function of the control signal. The die plates held in each case cause tapering of the deformation element.

18 Claims, 5 Drawing Sheets

(56) References Cited

U.S. PATENT DOCUMENTS

| | | | |
|---|---|---|---|
| 4,181,198 A * | 1/1980 | Lindberg | 188/371 |
| 5,273,240 A * | 12/1993 | Sharon | 244/122 R |
| 6,135,251 A | 10/2000 | Hartlieb et al. | |
| 7,604,269 B2 * | 10/2009 | Matsubara et al. | 293/119 |
| 8,172,025 B2 * | 5/2012 | Nolze et al. | 180/274 |
| 2006/0022473 A1 * | 2/2006 | Hansen | 293/133 |
| 2006/0163862 A1 * | 7/2006 | Satou et al. | 280/777 |

FOREIGN PATENT DOCUMENTS

| | | |
|---|---|---|
| EP | 2014517 | 1/2009 |
| JP | 46-7049 | 2/1971 |
| JP | 2008-12942 | 1/2008 |
| JP | 2008-302712 | 12/2008 |

* cited by examiner

DEVICE AND METHOD FOR THE ADAPTIVE DEGRADATION OF COLLISION ENERGY

FIELD OF THE INVENTION

The present invention relates to a device and a method for the adaptive degradation of collision energy.

BACKGROUND INFORMATION

A crash box is described in European Patent No. EP 1 792 786 A2, having a housing-like deformation profile having a flange plate on the side of the longitudinal chassis beam, and is designed as a folded structure made of sheet metal. The deformation profile is composed of two shell components, a flange plate section being integrally molded onto each shell component. The shell components are folded from sheet metal blanks, then combined and joined together with the aid of resistance welding points. This represents a conventional crash box without any adaptation to a collision process. However, such an adaptation is described in German Patent No. DE 197 45 656 A1, for example. An impact absorber for a motor vehicle is described therein, it being possible to control a deformation as a function of a pre-collision signal, i.e., a signal of a panoramic vision sensor system such as a radar sensor system, or an impact signal. Sliders are moved on a deformation element perpendicular to the direction of force, and therefore block the deformation elements, so that due to the action of force these deformation elements degrade collision energy by plastic deformation caused by the blocking. Adaptation to the collision process is possible via a parallel arrangement or by intercombination of such deformation elements. As another example, it is proposed to use a deformation element for the degradation of collision energy, with the aid of tapering. One element is fixed for the tapering, and another element may be released by a slider in order to reduce the tapering.

The slider moves radially, i.e., perpendicularly to the direction of force and thus to the longitudinal axis of the deformation element, which is usually a cylinder having a predefined wall thickness.

SUMMARY

An example device according to the present invention and an example method according to the present invention for the adaptive degradation of collision energy may have the advantage that multistage tapering of the deformation element is easily possible using so-called die plates which have an opening through which the deformation element is driven. This is made possible by the fact that the actuator system now likewise moves in the direction in which the deformation element also moves, so that an axial motion of the actuator system is present. This system makes it possible that any number of die plates may be held by the actuator system and may thus contribute to the tapering. In this way, very accurate control or adjustment of the tapering is easily possible. This is not possible in the conventional design. In addition, the example device according to the present invention allows collision energy to be supported via the housing, unlike conventional devices, in which the collision energy must be supported by the so-called sliders which hold the die plates, so that the actuator system which has the sliders may be more easily manufactured without the need for as much stability.

In the present case, the example device is an adaptive crash box, for example, which at least has connections in order to activate the actuator system as a function of the control signal.

In refinements, it is possible for the device itself to have a dedicated control unit and/or a sensor system for detecting the collision process or a pre-collision process, the control unit processing these sensor signals and generating control signals as a function of same.

The adaptive degradation of the collision energy means that the collision energy resulting from the impact is at least partially absorbed by the crash box in an adaptive manner via plastic deformation. Costs may be saved as a result of the adaptation. Protection for the occupants of the host vehicle as well as of the other vehicle involved in the accident is improved in this way.

The deformation element is, for example, a steel cylinder which in the collision process is tapered with the aid of the device according to the present invention; degradation of the collision energy results from this tapering, which represents a plastic deformation. Besides steel, other materials such as plastics or composites or the like may be used, and in addition other geometries such as a cone, a cylinder having an elliptical cross section, or rectangular or square shapes are possible here. In addition, geometries may be used whose wall thicknesses are not constant over the length, for example a cylindrical tube having an increasing wall thickness. The deformation element in particular may be hollow, for example a simple tube, or it may be filled with various materials such as aluminum foam in the center or in the cavities, when multiple cavities are involved. In addition to greater robustness against buckling, this aluminum foam has the advantage of either being able to ensure greater energy absorption or allowing use of a smaller tube diameter. Another alternative to make effective use of the filler material is to use a smaller wall thickness of the tube or the cylinder. The present invention in particular allows a very compact design of the device according to the present invention, and thus saves installation space for other components.

The direction in which the deformation element moves is usually the collision direction. For a front end collision, this is in the direction of the longitudinal axis of the vehicle, which is typically also referred to as the X direction. As a result of this motion, the deformation element is guided against the die plates and driven through their respective openings, resulting in the tapering, and therefore, degradation of the collision energy via the plastic deformation.

The actuator system is used for the adaptation to the collision process; the actuator system generally has actuators and sliders which, depending on the actuator position, may be extended or retracted, specifically in the axial direction, i.e., in the longitudinal direction of the vehicle, for example. An actuator may move an individual slider or also multiple sliders. The number of sliders required depends on the die plate design. The sliders have play with respect to the housing and the plates. Thus, the actuator system is able to move these sliders with very low frictional losses, resulting in a very rapid actuating period.

A requirement imposed on the actuators is a high adjustment speed. The actuators may operate in a continuously variable manner. An adjustment in multiple stages is advantageous due to the fact that rapidity is ultimately achieved. If the mass and the friction are low, high actuator dynamics are ensured and the actuator travel distances are short. The actuator travel distances may be further shortened by optimizing the shape of the die plates, for example by a smaller thickness at the outer diameter.

The control signal is understood to mean the signal which causes the actuator system to adjust the appropriate tapering. This control signal may originate from outside the device, for example from a safety control unit, in particular an airbag control unit. However, the control signal may also be generated internally within the device, for example by a dedicated control unit or an appropriate control circuit. The control signal may have an analog or a digital design. A digital design requires appropriate evaluation by the actuator system. In one simple variant, the control signal could be composed of only three levels, for example, in order to signal three different positions of the actuator system. According to the present invention, this actuator system moves in the axis of the direction of the first motion, i.e., coaxially with respect to the collision direction, i.e., the direction of motion of the deformation element. The tapering is adjusted as a result of the motion of the actuator system in this direction. Due to the motion of the actuator system, at least one die plate having a respective opening through which the deformation element is driven is held for adjusting the tapering. It should be noted that an additional die plate having a larger opening is usually fixed and always causes tapering, and is not influenceable at all by the actuator system. The opening may be a circle or an ellipse, or may have a rectangular, hexagonal, or other shape. The number of die plates to be held is established by the control signal. If various die plates, each having different openings, are used, this results in adaptation of the tapering. Accordingly, the actuator system establishes how many die plates are connected one behind the other. Only a die plate which is held by sliders is also able to cause tapering, since otherwise the deformation element would separate this die plate as a result of its existing predetermined breaking points, and push the resulting segments outwardly into the cavity.

A die plate is a plate made of a very stable material which plastically deforms the deformation element to a smaller diameter in the event of a collision. The greater the difference in the diameters of the deformation element and the die plate, the more energy is absorbed. A die plate has at least one predetermined breaking point. However, three predetermined breaking points are advantageously provided at angular intervals of 120°. When these predetermined breaking points break, the die plate is divided into three parts. If the die plate is axially supported by the sliders, the predetermined breaking points do not break, and the deformation element is tapered. However, if the die plate is not supported by the slider, the predetermined breaking points break as the result of penetration of the deformation element. This results in three segments which do not cause tapering.

Alternatively, a die plate may be produced directly from at least two individual segments; this spares the effort of producing the predetermined breaking points, but makes centering of the individual segments more complicated.

It may be advantageous for the device to have an elastic element which is mounted in such a way that the elastic element moves a first predetermined distance before the deformation element moves. This means that short distances are absorbed by this elastic element, and do not result in tapering of the deformation element. As a result of this relatively small distance change, it is possible to measure the intrusion path and the intrusion speed. This is advantageous for the rigidity setting of the collision structure. This elastic element also allows very small force levels, such as from parking dents, i.e., impacts which occur at less than 5 kilometers per hour, to be absorbed without damage. In addition, the elastic element is used for compensation of installation tolerances of the entire front end structure. Furthermore, the example device according to the present invention is thus more robust against collisions which do not act strictly axially on the collision structure. So-called "real world collisions" having an oblique component are thus partially compensated for. An elastic element is a spring, for example, which is located in the deformation element, preferably on the side of the crossmember. Alternatively, the spring element may be made of a rubber-like plastic.

It is also advantageous that an initial configuration of the device is such that maximum tapering of the deformation element is provided, and all die plates are held. This means that in an initial configuration, i.e., a starting position, it is always provided that the device or the method according to the present invention is designed for a severe collision, and therefore provides maximum tapering of the deformation element. The control signal makes it possible to release die plates, thereby reducing the tapering. Maximum self-protection for the host vehicle is thus achieved. This may be achieved, for example, in that one or multiple springs ensure(s) that all die plates are held without activating the actuator. Other options may be provided in which all die plates are held by default, thereby achieving maximum tapering. Thus, the initial configuration is the configuration that is present without the actuator system being activated by a control signal. The maximum tapering is the tapering that is achieved by the die plate which has the smallest diameter. However, as the result of carrying this out in steps, i.e., additional dies having openings between the largest and the smallest diameter usually being present between the largest and the smallest opening, a transition is achieved without generating a force impact.

It is also advantageous if the particular die plates, except for those having the largest opening, each have at least one predetermined breaking point which is broken by the motion of the deformation element when there is no holding of the particular die plate by the actuator system. The predetermined breaking points are broken without the holding, so that the die plates or their remaining segments are then pushed away radially to the side by the deformation element, and do not contribute to the tapering. However, in accordance with the present invention, each die plate may be individually controlled without the die plates which have a larger diameter being held. However, as stated above, the first die plate is usually permanently installed, so that there is no possibility or need for it to be held at all by the actuator system. The predetermined breaking points in the die plates may be implemented using laser or water jet processes. This allows simple manufacture and improved handling of the plates, since they are self-centering.

It may also be advantageous if at least one die plate has a coating for reducing the friction. This allows reduction of the friction when the segments of the die plates are radially pushed away, and therefore, simplification of this pushing away. This coating may be applied using Teflon or an anti-friction coating. A coating at the outer diameter of the die plates which reduces the friction between sliders and die plates is also advantageous.

It may also be advantageous if the device has a speed sensor for detecting the impact speed, the control signal being generated based on the output signal of the speed sensor. This speed sensor is a radar system, for example, which is situated in the center axis of the deformation element and which looks through the deformation element, which is usually hollow, thus allowing detection of a collision object, and thus also ascertains the impact speed shortly before the impact. In addition, a pre-collision analysis, even if limited, is thus possible. In addition to the signal of this speed sensor, which may also be capacitive, inductive, optical, ultrasonic, or a linear potentiometer, there may be signals of other sensors, for example a pre-collision sensor system such as radar, mono or stereo video, or a capacitive sensor. As a result of this design, the installation of so-called "upfront sensors," i.e., acceleration sensors at the front end of the vehicle, may advantageously be dispensed with, or these sensors may be installed directly in the device according to the present invention.

It may also be advantageous if the actuator system is activatable in an inductive manner. When the example device is in its initial position, i.e., all die plates are held and therefore maximum tapering is provided, as the result of an inductive design of the actuator system, for example by the excitation of coils, the sliders may be retracted into the actuator system so that the die plates are no longer held and may then be pushed away by the deformation element. For example, an additional coil may be added for each die plate that is held. However, this may also be adjusted via the current intensity.

It may also be advantageous if the actuator system holds the particular die plates in such a way that the actuator system holds a particular pipe clamp together for the particular die plate. With the aid of the actuator system, for example, a pin is inserted into the pipe clamp and thus holds the pipe clamp fixed, whereas this is no longer the case when the pin is pulled out, and the corresponding die plates may be pushed away. In this embodiment as well, the original state is designed in such a way that the tapering is at a maximum in the de-energized state. In the de-energized state, each die plate is held by its associated pipe clamp, and these pipe clamps are held by a shared pin. When a minor collision is detected, the actuator system pushes the pin back so that it is no longer possible for one or multiple die plates to be held by the pipe clamps, and the predetermined breaking points of the affected die plates break. The advantage is that only one actuator and only one pin are required; however, the cavity (installation space), in which the clips of the pipe clamps reciprocate if necessary, must be designed to be larger.

The deformation element may advantageously be pushed through the openings in the die plates with the aid of a bolt. For this purpose, the deformation element is at least partially closed at the end which is passed through the openings first, so that the bolt may be guided against this closed end. Thus, a type of deep drawing is present. The bolt is connected to the crossmember in such a way that an impact on the bolt in the collision direction exerts a force, so that the bolt pushes the deformation element through the particular openings.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
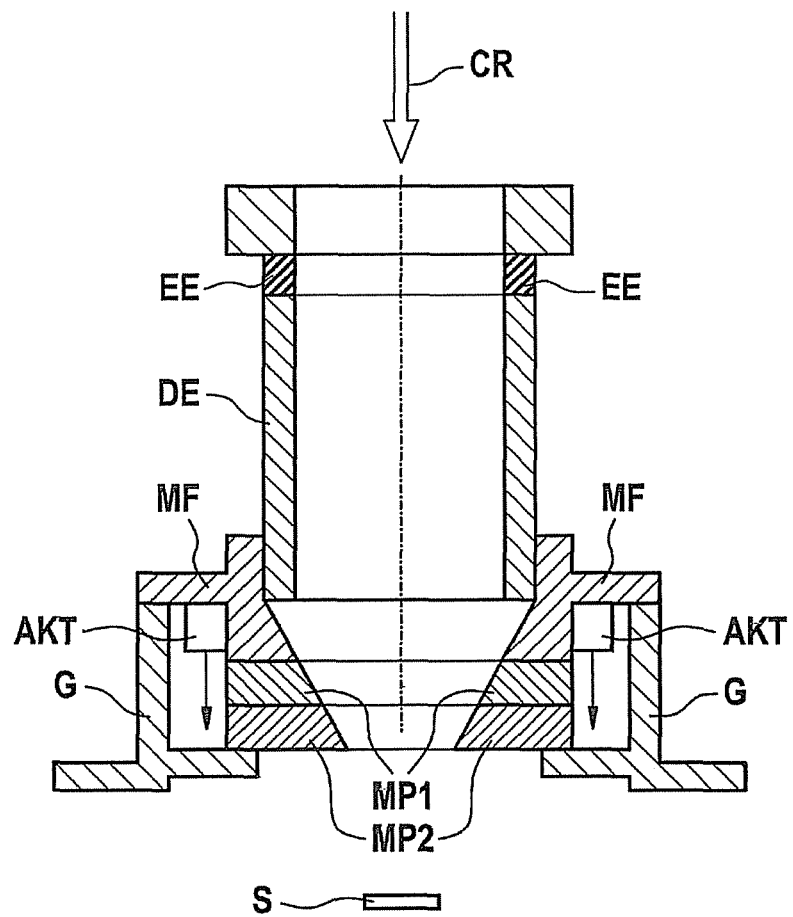
FIG. 1 shows a first sectional view of an example device according to the present invention.

FIG. 1 shows an example device according to the present invention, having a deformation element DE which is axially oriented in collision direction CR. This means that the collision, i.e., the collision force, pushes deformation element DE in the longitudinal direction, or axially toward die plates MF, and MP1 and MP2. However, elastic element EE is compressed beforehand in order to filter out minor impacts such as slight parking dents, etc. This reduces the repair effort for a vehicle which makes use of the example device according to the present invention. Elastic element EE is therefore usually made of an elastic material which is compressible, and of materials such as rubber or an appropriate plastic. Elastic element EE may also be designed as at least one spring which may be made of metal, for example. If deformation element DE is designed as a cylinder, for example, this also applies to elastic element EE, which is thus designed as a ring. In the figure this is also indicated by the axis of symmetry, which is illustrated as a dashed line.

Deformation element DE is initially tapered by die plate MF, which is supported via housing G. This die plate MF is fixed, and always results in tapering of deformation element DE. The same as the other die plates MP1, MP2, die plate MF is made of a harder material than deformation element DE so that tapering of deformation element DE is possible. Otherwise, die plate MF would be deformed. As a result of the support via housing G, the applied collision force is diverted via housing G and then to the longitudinal chassis beam, etc. However, collision energy is already degraded by die plate MF as the result of the plastic deformation.

Elastic element EE acts as a type of noise threshold for collision processes; i.e., only after a certain severity of the collision processes is elastic element EE compressed until no further compression is possible, and deformation element DE is thus moved toward die plates MF, MP1, and MP2, so that after this noise threshold is exceeded, deformation element DE is always plastically deformed by die plate MF. Additional die plates MP1 and MP2 may be held by actuator system AKT if necessary, resulting in further tapering. Thus, the adaptation to the collision process is carried out using these die plates MP1 and MP2. This means that the greater the severity of the collision process, the more die plates are used. In the present case, only three die plates are illustrated in FIG. 1. However, further refinement is possible in which more than three die plates are used. The present invention allows control of any desired number of such die plates. Actuator system AKT executes a motion in collision direction CR, and thus, an axial motion in the longitudinal axis of deformation element DE. Since die plate MF is always supported by housing G, the actuator system may be situated behind this die plate MF in order to hold the other die plates MP1 and MP2 if necessary, and thus cause additional tapering of deformation element DE and therefore allow further degradation of collision energy. Actuator system AKT responds to a control signal, not illustrated here, which, however, may originate from outside the device according to the present invention, for example from an airbag control unit. However, such a control unit may also be located within the device itself, and may thus generate the control signal based on sensor signals or other signals from other control units. In addition to a panoramic view such as video, radar, LIDAR, etc., other pre-collision signals such as braking signals or other ESP signals or navigation data may be used to allow better characterization of the collision.

In the present example, a sensor system S is situated in the rotational axis, for example a radar system, which looks on a potential impact object through deformation element DE, and may thus determine the impact speed, and therefore provides for the control signal, with subsequent processing of the sensor signal of the radar sensor. Instead of a single-chip radar, this sensor may have another form such as LIDAR, an ultrasonic sensor, or an inductive or capacitive sensor.

The energy which is degraded as a result of the tapering is also a function of the material selection of deformation element DE, the wall thickness, and optionally also a filling of deformation element DE. The maximum energy to be degraded in this way may thus be established in advance according to vehicle type and specification.

Figure 2:
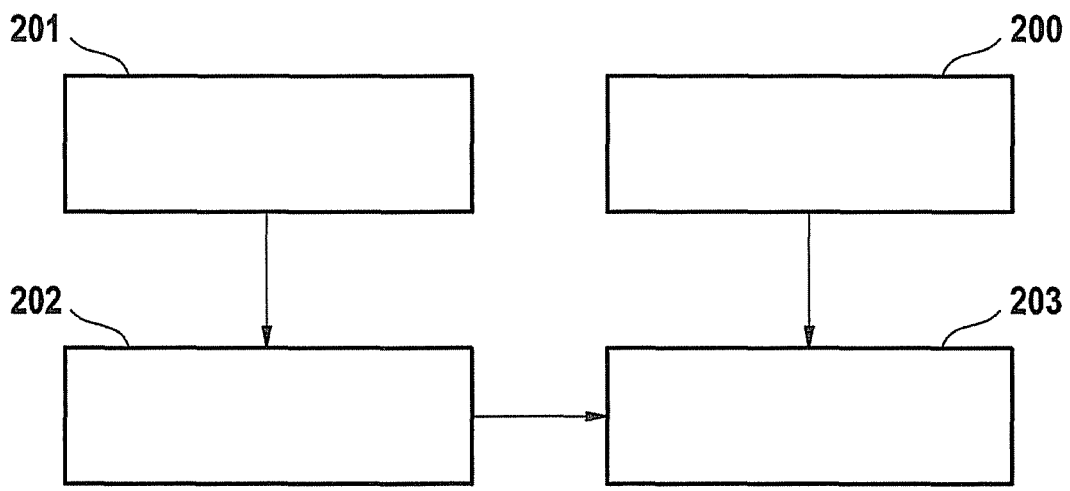
FIG. 2 shows a flow chart of an example method according to the present invention.

FIG. 2 shows an example method according to the present invention in a flow chart. In method step 201, sensor S detects the impact speed, the change thereof over time, and the intrusion path on an impact object. On this basis, actuator system AKT adjusts the necessary tapering in method step 202. This may be achieved using a table, for example, in which impact speeds are associated with a certain tapering. As a result of the collision, in method step 200 deformation element DE moves toward plates MF, MP1, and MP2 after the noise threshold, which is established by elastic element EE, has been exceeded. Thus, as a result of the appropriately adjusted tapering, corresponding die plates are held by the actuator system or its slider, and deformation element DE tapers during the motion in the collision direction toward sensor system S, and thus degrades the collision energy via plastic deformation. Additional energy is diverted via housing G.

Figure 3:
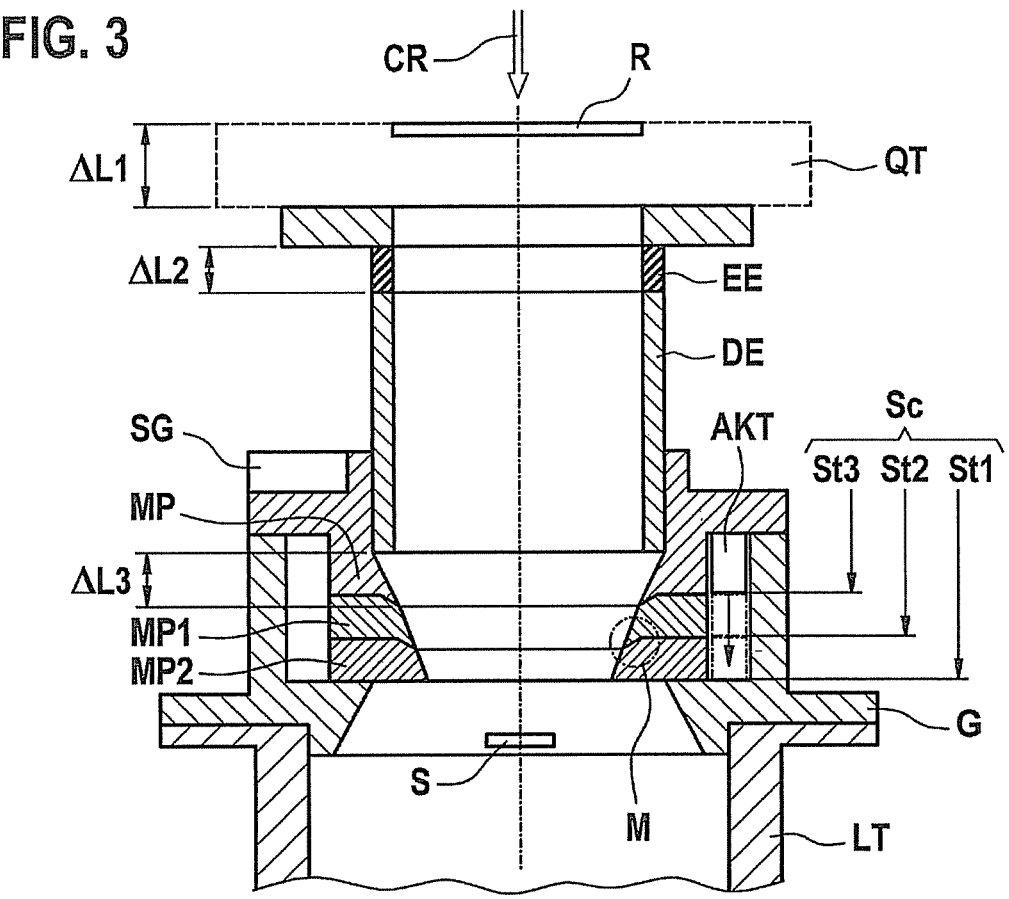
FIG. 3 shows a second sectional view of the example device according to the present invention.

FIG. 3 shows an example of the design of the device according to the present invention. Arrow CR once again represents the collision direction. The impact object initially strikes the bumper (not illustrated). The impact is transmitted directly to crossmember QT. The crossmember generally contributes to vehicle stability and collision safety, and connects both longitudinal chassis beams, i.e., both collision structures, to one another. A reflector R may be used to provide an option for better reflection of the radar waves emanating from the sensor. Crossmember QT has a thickness ΔL1. This is followed by deformation element DE, which has elastic element EE. The thickness of elastic element EE is ΔL2. This is followed by fixed die plate MP, which has a taper distance ΔL3. Control unit SG as well as actuator system AKT, together with its sliders SC in positions ST1, ST2, and ST3, are situated behind fixed die plate MP. Position ST1 is the so-called initial position or the moving away position; i.e., the device according to the present invention is configured in the initial position in such a way that maximum tapering is made possible, so that in the event of a severe collision no change by actuator system AKT is necessary. This position ST1 may be ensured, for example, by a corresponding spring action against which actuator system AKT must work in order to move into the other positions ST2 and ST3. Position ST2 holds only one additional die plate besides the fixed die plate, and position ST3 ensures that sliders SC are concealed behind die plate MP, which is always available. The die plates are supported via housing G, housing G being connected to longitudinal chassis beam LT. Sensor system S is once again situated on the rotational axis, and may thus look on an impact object through deformation element DE. Feature M is emphasized in the present case. This feature M indicates the manner in which middle and right die plates MP are situated. This undercut, or, stated more simply, this edge, has a double function:

The centering of the plates: All plates, regardless of their number, are automatically centered, so that the deformation element and the die plates have the same axis.

The pushing away of the plates after the predetermined breaking points break: In position ST3 the tube, which is deformation element DE, only has to be tapered by the left plate, i.e., plate MP, which is always fixed. This means that the middle and right die plates are pushed outward. If this feature M were not present, and the die plates were situated as customary washers, at position ST3 only the middle die plate, but not the right die plate, would be pushed outward. As a result, deformation element DE would abut against the flat plane of the right plate. This would result in a disadvantageous large peak force due to the fact that proper tapering does not take place.

The sensor system is a speed measuring system, preferably a so-called radar system as illustrated, which is integrated into the device. In addition to the low costs, this sensor S provides another prerequisite for meeting the requirements for accuracy and rapidity. This radar is able to very accurately determine the distances and also the change in distance, i.e., the speed, at very high sampling rates in one dimension, in this case axially. Thus, the speed at which the deformation element initially deforms may be ascertained at a very early point in time after the impact. As previously mentioned, other sensors such as capacitive, inductive, ultrasonic, and acceleration sensors as well as a linear potentiometer are suitable for this measurement.

A pre-collision sensor system may also preferably influence the control signal for adjusting the tapering. This pre-collision signal together with the one panoramic signal may therefore also come from a mono or stereo video sensor system, or a radar or LIDAR system. In this case, the reversibility is advantageous for the present invention. Since actuator system AKT may be reversibly activated, it may be easily combined with the pre-collision sensor system just mentioned. Thus, the adaptive structure may already be adjusted before the collision, if necessary. If a collision does not occur, the initial position may be resumed. Another advantage is that the so-called upfront sensors, i.e., acceleration sensors at the front end of the vehicle, which are sometimes used, may either be dispensed with or directly integrated into the device.

In the present case, actuator system AKT is connected to sliders SC. Sliders SC are elements which, depending on the actuator position, may be extended and retracted, specifically in the axial direction. Actuator system AKT may move an individual slider or also multiple sliders SC. The number of sliders SC required, in the present example six, depends on the die plate design. Sliders SC have play with respect to housing G and the die plates. Thus, actuator system AKT is able to move these sliders SC in a force-free manner, and therefore very quickly.

The main requirement imposed on the actuator system is the high speed. The actuator system may operate in a continuously variable manner, although adjustment in multiple stages is advantageous due to the fact that rapidity is ultimately achieved. According to FIG. 3, an inductive actuator system is used. The armature and sliders SC have the smallest possible mass. For this purpose, for example, a design of the sliders as hollow elements is possible. In position ST1 a solenoid is in a stable, extended, de-energized end position. The armature is spring-loaded, so that this end position may be robustly held. In position ST2 the solenoid is provided with a first energized coil, so that the armature and the sliders are in the position specified by the design. In position ST3 the solenoid is acted upon by a second energized coil, so that here as well, the armature and the slider are in the position specified by the design. One advantage is that high actuator dynamics are ensured, since the mass as well as the friction are low, and the actuator travel distances are short. These short actuator travel distances may be further shortened by optimizing the shape of the die plates, for example by a smaller thickness at the outer diameter. Another advantage is that the solenoids do not have to be monitored by separate sensors. Due to the changed and measurable inductance of the coils, the position of the armature and the correct function of the actuators may be monitored via control unit SG. Actuator system AKT is self-monitoring, in a manner of speaking.

As stated above, in the initial position, actuator system AKT is de-energized and is therefore in position ST1. In a worst case scenario, for example for a defective actuator system, the adaptive structure would remain at maximum rigidity, i.e., cause maximum tapering, and thus place priority on self-protection. The time which is available to this device for going from the position of maximum rigidity, i.e., maximum tapering, to another position is composed of the following deformation distances:

The distance resulting from the deformation of the crossmember; i.e., reflector R approaches closer to sensor S. This is distance ΔL1.

The distance resulting from the deformation of the elastic element is distance ΔL2.

The distance covered by deformation element DE until the smallest diameter of the first die plate is reached. This is the start of tapering (distance ΔL3).

Thus, it may be stated that the response time required by actuator system AKT, i.e., the actuating period, the computing time of control unit SG, and the detection and processing time of sensor system S, to carry out a change in rigidity of the adaptive structure according to the present invention [is determined by] traveling over lengths ΔL1+ΔL2+ΔL3.

The mode of operation of the structure according to FIG. 3 is explained once more below. As an option, pre-collision sensors may initially recognize an imminent collision and distinguish between a stationary object and a traveling object. Optionally, the size and the mass of the impact object may also be established. The point in time when the host vehicle is in contact with the obstruction, i.e., the impact object, is then indicated. The deformation of the front end in the region of crossmember QT begins. Crossmember QT deforms elastic element EE of deformation element DE. The internal speed sensor detects the deformation, in particular the distance, the speed, and the change thereof. Control unit SG assesses the severity of the accident and makes a decision concerning the required strength of the crash box. As stated above, the control unit is either a part of the device or is situated externally. Control unit SG emits an appropriate signal to actuator system AKT, so that the actuator system brings about appropriate positions ST1 through ST3. The plastic deformation of the crash box begins, for which there are three different scenarios:

Scenario 1

Control unit SG registers a severe accident. Use must be made of the entire rigidity of the crash box. As much energy as possible is dissipated. Actuator system AKT is already in the initial position in the completely extended position, i.e., up to the third die plate in the example. This means the shortest possible response time. Due to the presence of sliders SC, the parts of die plate MP are not able to give way toward the outside. The predetermined breaking points are therefore not broken. The maximum tapering will take place, and the deformation element must be deformed by all the die plates. The deformation of the host vehicle clearly extends beyond the crash box. Further energy is absorbed in the longitudinal chassis beam, thus achieving self-protection.

Scenario 2

Control unit SG registers an accident of medium severity. The rigidity of the crash box is reduced in a targeted manner to the benefit of the other party to the accident in order to thus degrade the energy in as optimal a manner as possible. Actuator system AKT retracts sliders SC to the second die plate, i.e., the middle die plate in the example. The last die plate having the smallest diameter is no longer held at the periphery by slider S. When deformation element DE arrives, the three segments of the plate which result when the predetermined breaking point breaks are pushed away outwardly. This last die plate does not cause tapering, and therefore no longer absorbs energy. In contrast, the middle die plate is still supported in the periphery by the sliders. It is thus not possible to push this die plate outward, and therefore this die plate causes tapering and thus absorbs energy. The first die plate remains present in any collision situation. The crash box and a portion of the longitudinal chassis beam are thus deformed. Good compatibility is thus achieved for a collision and for the other vehicle involved in the accident, and this is also suitable for a side collision.

Scenario 3

Control unit SG registers a minor accident. Actuator system AKT completely retracts sliders SC. This means the longest response time. The response time is by no means problematic, since when a minor accident is sensed, the most time is also available due to the fact that the deformation occurs slowly. Neither the last die plate, the right die plate having the smallest diameter, nor the middle die plate is held at the periphery by the sliders. When deformation element DE arrives, the three segments of the middle and right die plates are pushed away outwardly, since the predetermined breaking points of both die plates break. These die plates do not cause tapering, and therefore no longer absorb energy. The first die plate remains in every case. Only the crash box is deformed, and the longitudinal chassis beam remains intact. This is suitable for pedestrian protection or for a so-called Allianz-Zentrum für Technik (AZT) repair collision (16 km/h).

Figure 4:
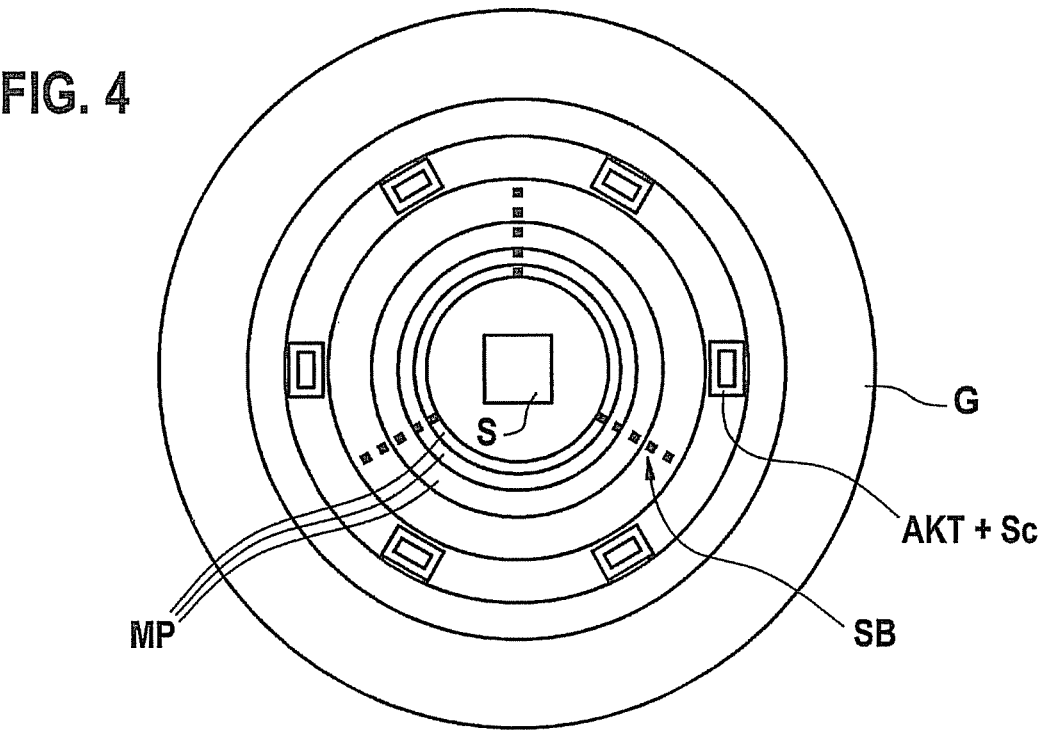
FIG. 4 shows a top view of this variant.

FIG. 4 shows a top view from the collision direction on the device according to the present invention according to FIG. 3. The rotationally symmetrical design of all components, in particular housing G, die plates MP, predetermined breaking points SB, slider SC, and actuators AKT, as well as sensor system S situated in the center, are visible.

Figure 5:
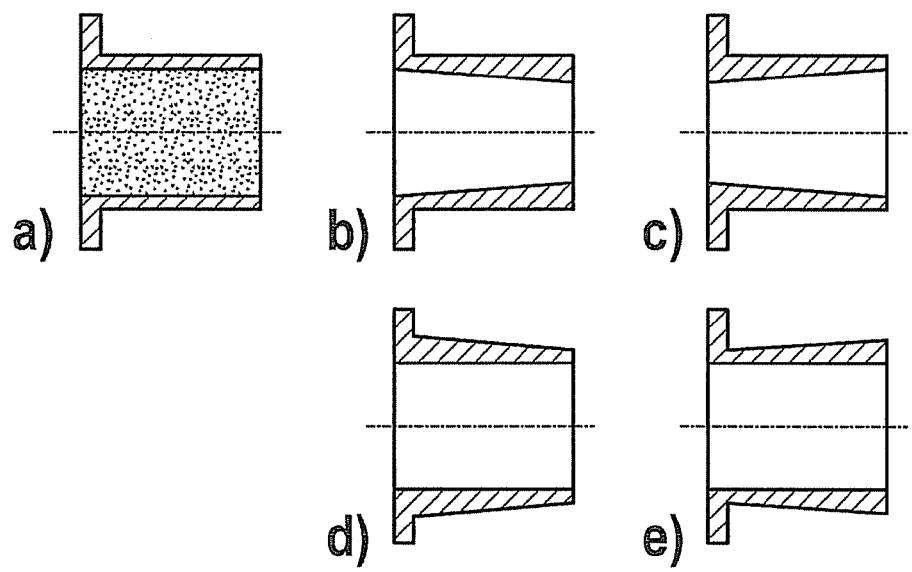
FIG. 5 shows various characteristics of the deformation element.
Figure 7:
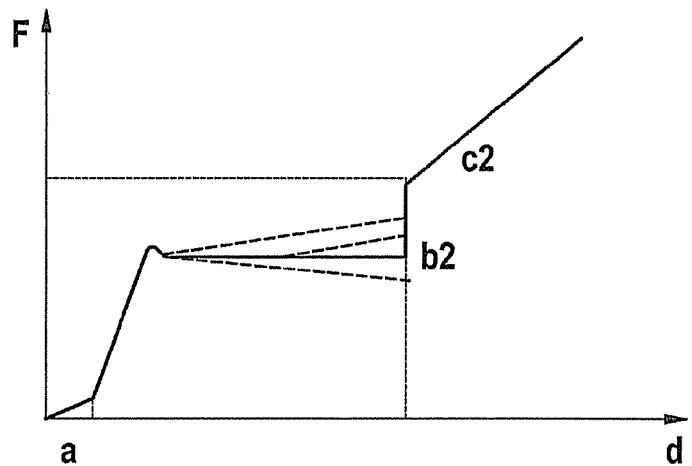
FIG. 7 shows another force-distance diagram.

FIG. 5 shows exemplary embodiments of the deformation element. FIG. 5a shows one embodiment in which the deformation element, which is a tube having a stop, may have a filled interior, which in the present case is filled with aluminum foam. In FIGS. 5b, 5c, 5d, and 5e, inner and/or outer walls are not parallel to the rotational axis, but instead are inclined at an angle relative to the rotational axis. The filling increases the robustness against buckling of the deformation tube. A constant wall thickness of the deformation element, as in FIG. 5a, results in a constant force curve over the tapering period. If the wall thickness of the deformation element is progressive, as in FIG. 5c or 5d, the force curve rises. On the other hand, if the wall thickness is degressive, as in FIG. 5b or 5e, the force curve drops. FIG. 7 shows one example of the progressive and degressive force curves.

Figure 6:
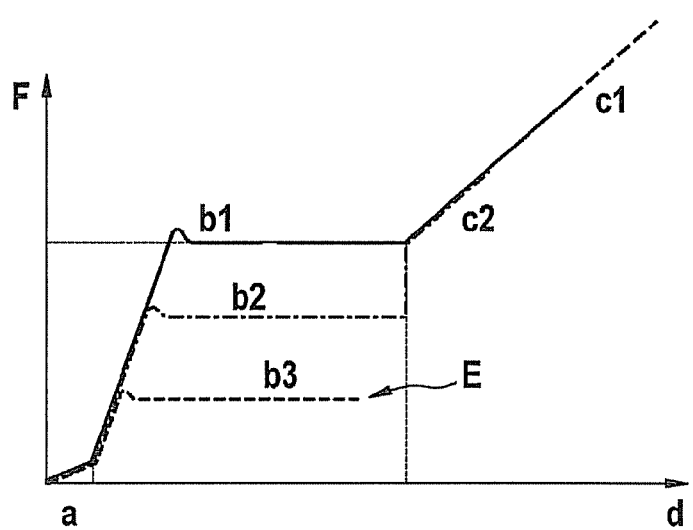
FIG. 6 shows a force-distance diagram.

FIG. 6 shows one possible force level of an adaptive structure. This is a diagram in which the force is represented on the ordinate and the distance is represented on the abscissa. The curve is divided into three segments. Segment A is the starting region of the crash box, the elastic region, and the region in which the bumper becomes crumpled. This characteristic is independent of the crash box settings, and is always the same. Segment B is split into three lines, namely, B1, B2, and B3, depending on the different rigidity settings of the device according to the present invention. Of course, depending on the characteristics of the device, additional levels may be set in the region of the collision structure. Curve B3 terminates because at that point in time the deformation in a minor collision ends. B1 and B2 merge into region C. In this region, the longitudinal chassis beam is also more or less deformed, depending on the collision values. This characteristic is likewise always the same, since no adaptation is present.

FIG. 7 shows possible variations in force levels of an adaptive structure in position 2. The variation in segment B results from the corresponding geometries of the deformation element.

Figure 8:
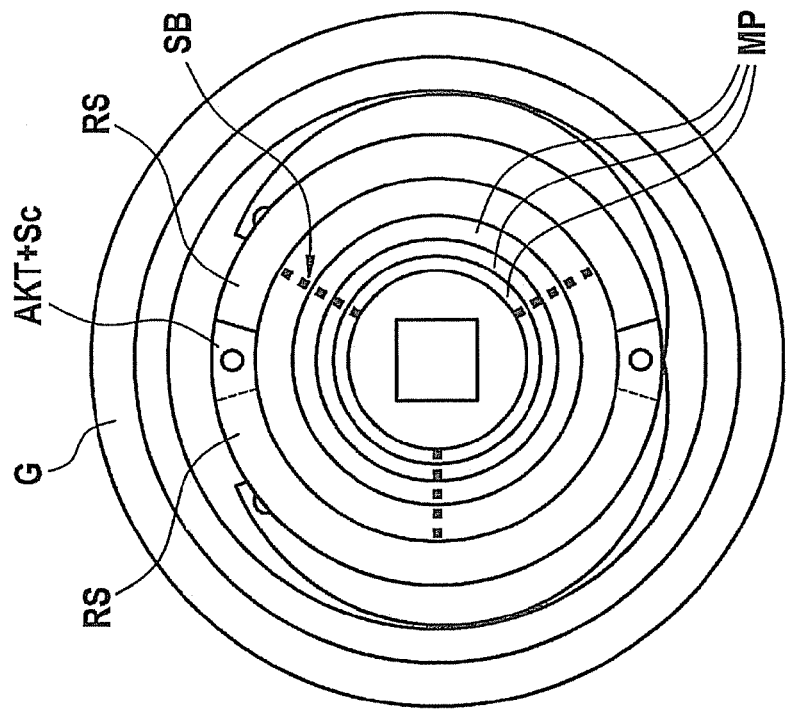
FIG. 8 shows a top view of the device according to the present invention which makes use of the pipe clamping principle.
Figure 9:
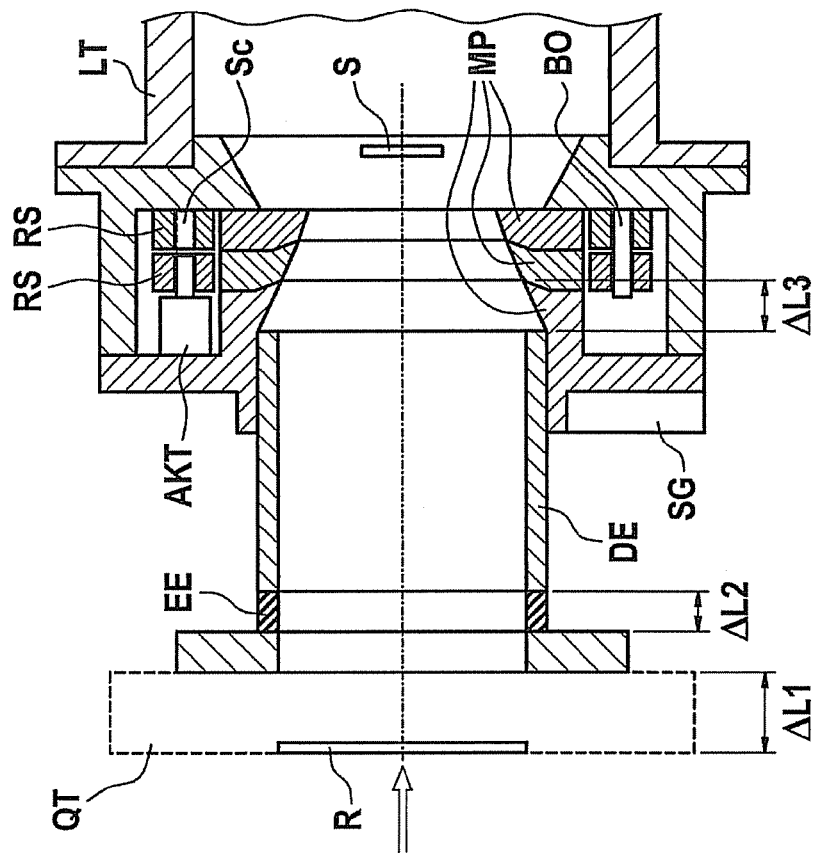
FIG. 9 shows a sectional representation of this variant.

FIG. 8 shows a top view of another exemplary embodiment of a device according to the present invention. Once again, the device is viewed from the collision direction. The rotationally symmetrical characteristic is apparent in housing G of actuator system AKT, having sliders SC, predetermined breaking points SB, die plates MP, and, shown for the first time here, pipe clamps RS1 and RS2 which are used for holding die plates MP1 and MP2. This is more clearly apparent in the sectional view according to FIG. 9. In this case identical components are denoted by the same reference numerals, the sole difference here being that die plates MP are held by pipe clamps RS1 and RS2, namely, one pipe clamp for the middle die plate and one pipe clamp, namely, RS2, for the right die plate. The most rigid configuration is provided when actuator system AKT completely extends the sliders and holds pipe clamps RS1 and RS2 together. This is still the de-energized state with priority on self-protection. In the middle location of position ST2, the slider of the actuator system blocks only first pipe clamp RS1. The second pipe clamp is opened by intruding deformation element DE; i.e., the two clips of the pipe clamp are pushed outward. However, the mode of operation and the configuration of die plates MP remain unchanged. An advantage of this variant is that only a single actuator and a single slider are necessary. This makes the overall system simpler, more robust, and also more economical. However, a disadvantage compared to the other exemplary embodiment according to FIG. 4 is that more installation space must be provided to be able to open the clips of the pipe clamps without colliding with deformation element DE.

Further functionally similar operating structures for holding the die plates may be used.

Figure 10:
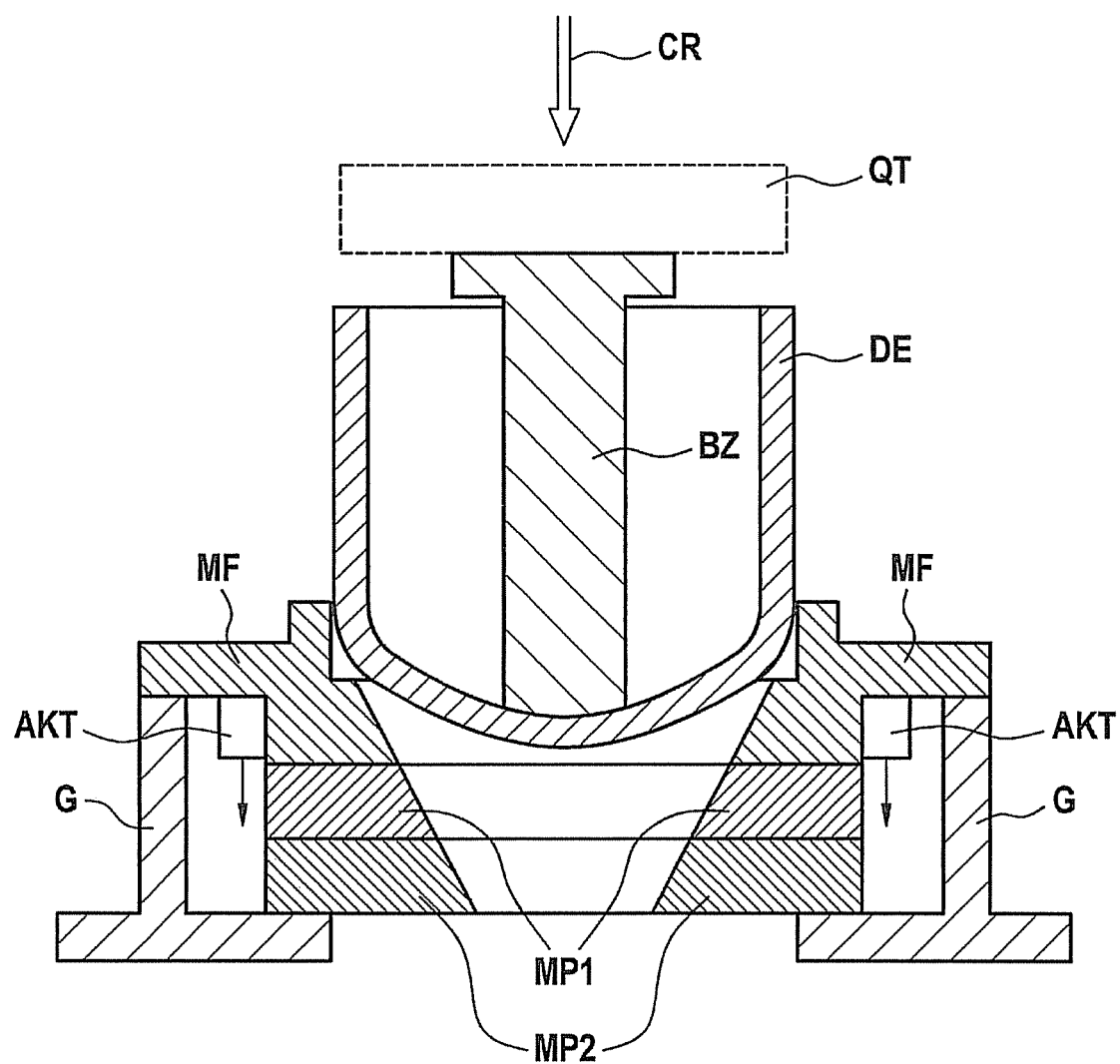
FIG. 10 shows another embodiment of the device according to the present invention.

FIG. 10 shows another specific embodiment of the device according to the present invention, which does not push a tube as a result of the tapering, but, rather, represents a type of deep drawing. A bolt BZ is connected to crossmember QT in such a way that an impact on crossmember QT causes the bolt to be moved in collision direction CR and therefore drives deformation element DE through the openings in die plates MF, MP1, and MP2. Die plates MP1 and MP2 are each held by actuator system AKT, depending on the control. Once again, force is partly dissipated via housing G. Deformation element DE is closed, at least partially, at the end which is driven through the openings first, so that bolt BZ is able to push deformation element DE through the openings in die plates MF, MP1, MP2.

What is claimed is:

1. A device for the adaptive degradation of collision energy, comprising:
    a deformation element configured to carry out a first motion in one direction for the adaptive degradation of the collision energy, and configured to undergo tapering while carrying out the first motion;
    a plurality of die plates consecutively situated along the direction of the first motion, each of the die plates having a respective opening through which the deformation element may be driven for adjusting the tapering of the deformation element; and
    an actuator system configured to adjust the tapering for the adaptive degradation as a function of a control signal, wherein the actuator system includes at least one slider that is configured for a second motion parallel to the direction of the first motion to adjust the tapering via the second motion, and as a result of the second motion, the actuator system is able to hold a quantity of the die plates, and the quantity of the die plates held by the actuator system being a function of the control signal, the respective openings of each of the quantity of the die plates held by the actuator system causing tapering of the deformation element.

2. The device as recited in claim 1, wherein the die plates which are not held are pushed away perpendicularly to the axis, the die plates each having multiple segments.

3. The device as recited in claim 1, further comprising:
    an elastic element mounted on the deformation element, wherein the elastic element is configured to move a first predetermined distance before the deformation element moves.

4. The device as recited in claim 1, wherein the device has an initial configuration such that a maximum tapering of the deformation element is provided, and all die plates are held.

5. A device for the adaptive degradation of collision energy, comprising:
    a deformation element configured to carry out a first motion in one direction for the adaptive degradation of the collision energy, and configured to undergo tapering while carrying out the first motion; and
    an actuator system configured to adjust the tapering for the adaptive degradation as a function of a control signal, wherein the actuator system includes at least one slider that is configured for a second motion parallel to the direction of the first motion to adjust the tapering via the second motion, and as a result of the second motion, the actuator system is able to hold a quantity of the die plates, and the quantity of the die plates held by the actuator system being a function of the control signal, the respective openings of each of the quantity of the die plates held by the actuator system causing tapering of the deformation element,
    wherein the held die plates, except for a die plate having a largest opening, each have at least one predetermined breaking point which is broken by the first motion of the deformation element when there is no holding of the held die plates by the actuator system.

6. The device as recited in claim 1, wherein the at least one die plate has a coating for reducing friction.

7. The device as recited in claim 1, further comprising:
    a speed sensor to detect at least one of an impact speed, a change of speed, and an intrusion path, the control signal being generated based on an output signal of the speed sensor.

8. The device as recited in claim 1, wherein the actuator system is activatable in an inductive manner.

9. A device for the adaptive degradation of collision energy, comprising:
    a deformation element configured to carry out a first motion in one direction for the adaptive degradation of the collision energy, and configured to undergo tapering while carrying out the first motion; and
    an actuator system configured to adjust the tapering for the adaptive degradation as a function of a control signal, wherein the actuator system includes at least one slider that is configured for a second motion parallel to the direction of the first motion to adjust the tapering via the second motion, and as a result of the second motion, the actuator system is able to hold a quantity of the die plates, and the quantity of the die plates held by the actuator system being a function of the control signal, the respective openings of each of the quantity of the die plates held by the actuator system causing tapering of the deformation element, wherein the actuator system is configured to hold a pipe clamp, of the held die plate, together.

10. A method for an adaptive degradation of collision energy, comprising:

moving a deformation element in a first motion in a first direction for adaptive degradation of the collision energy, and tapering the deformation element;

adjusting the tapering for the adaptive degradation, using an actuator system, as a function of a control signal; and moving a slider of the actuator system in a second motion in a second direction parallel to the first motion to adjust the tapering of the deformation element, and as a result of the second motion, the actuator system holds a quantity of die plates of a plurality of die plates situated along the direction of the first motion, each of the die plates having a respective opening through which the deformation element maybe driven for adjusting the tapering, and the quantity of die plates held by the actuator system being a function of the control signal, the respective openings of each of the quantity of the die plates held by the actuator system causing tapering of the deformation element.

11. The device as recited in claim 1, wherein for the first motion, the deformation element is pushed through the opening by at least one bolt.

12. The device as recited in claim 1, wherein the actuator system is configured to adjust the tapering to a necessary amount of tapering, as determined by the control signal, by holding the quantity of die plates corresponding to the necessary amount of tapering, wherein an increase in tapering is achieved with an increase in the quantity of die plates held by the actuator system.

13. The device as recited in claim 1, wherein each die plate of the plurality of die plates is configured to be held by the actuator system independently from other die plates of the plurality of die plates.

14. The device as recited in claim 1, wherein each respective opening of each die plate of the plurality of die plates is a different diameter.

15. The device as recited in claim 14, wherein the deformation element carries out the first motion by being driven through the respective openings of the plurality of die plates, and the actuator system holds various die plates, as a function of the control signal, having respective openings which decrease in diameter as the deformation element is driven in the direction of the first motion, thereby adjusting the tapering.

16. The device as recited in claim 1, wherein a first die plate of the plurality of die plates is fixed and not influenceable by the actuator system.

17. The device as recited in claim 4, wherein the maximum tapering is achieved by a die plate having a respective opening that is the smallest in diameter.

18. The device as recited in claim 4, wherein the actuator system is configured to release die plates, thereby reducing the tapering.

* * * * *